United States Patent
Faham et al.

(10) Patent No.: US 10,320,811 B1
(45) Date of Patent: Jun. 11, 2019

(54) IMPERSONATION DETECTION AND ABUSE PREVENTION MACHINES

(71) Applicant: Microsoft Technology Licensing, LLC, Redmond, WA (US)

(72) Inventors: Carlos Faham, Sunnyvale, CA (US); Grace Tang, Los Altos, CA (US); Yuefeng Li, Santa Clara, CA (US); David Freeman, Mountain View, CA (US); Jenelle Bray, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 130 days.

(21) Appl. No.: 15/458,592

(22) Filed: Mar. 14, 2017

Related U.S. Application Data

(60) Provisional application No. 62/459,731, filed on Feb. 16, 2017.

(51) Int. Cl.
*H04L 29/06* (2006.01)
*G06Q 50/00* (2012.01)
*G06F 21/30* (2013.01)

(52) U.S. Cl.
CPC .......... *H04L 63/1408* (2013.01); *G06F 21/30* (2013.01); *G06Q 50/01* (2013.01)

(58) Field of Classification Search
CPC ................................ G06F 21/30; G06Q 50/01
See application file for complete search history.

(56) References Cited

U.S. PATENT DOCUMENTS

| 8,225,413 B1* | 7/2012 | De ..................... G06F 21/6245 726/22 |
| 2013/0139236 A1* | 5/2013 | Rubinstein .......... H04L 63/1483 726/7 |
| 2013/0247159 A1* | 9/2013 | Hall ........................ G06F 21/31 726/6 |
| 2013/0339141 A1* | 12/2013 | Stibel ..................... H04L 63/08 705/14.49 |
| 2015/0106903 A1* | 4/2015 | Mihara ............... H04L 63/0823 726/8 |
| 2015/0161620 A1* | 6/2015 | Christner ........... G06Q 30/0185 705/318 |
| 2016/0134645 A1* | 5/2016 | Kadashevich ...... H04L 63/1408 726/26 |
| 2017/0061428 A1* | 3/2017 | Prabhu ............... G06Q 20/3674 |
| 2017/0358032 A1* | 12/2017 | Huffner .................. G06Q 50/01 |

* cited by examiner

*Primary Examiner* — Thaddeus J Plecha
(74) *Attorney, Agent, or Firm* — Schwegman Lundberg & Woessner, P.A.

(57) ABSTRACT

Systems and methods for impersonation detection and abuse prevention are disclosed. In example embodiments, a batch server of a social networking service receives a new registration or an update for an account, the account comprising a name and identity-related information. The batch server determines that the name and the identity-related information of the account matches one or more other accounts of the social networking service. The batch server detects a suspicious behavior of the account. The batch server limits, in response to the suspicious behavior, access to the account unless or until an identity of a user of the account is verified.

22 Claims, 9 Drawing Sheets

IMPERSONATION DETECTION AND ABUSE PREVENTION MACHINES

PRIORITY CLAIM

This application claims priority under 35 U.S.C. § 119 to United States Provisional Patent Application Ser. No. 62/459,731, filed Feb. 16, 2017, and titled, "IMPERSONATION AND ABUSE PREVENTION MACHINES," which is incorporated herein by reference in its entirety.

TECHNICAL FIELD

The present disclosure generally relates to machines configured for impersonation detection and abuse prevention in a social networking service, including computerized variants of such special-purpose machines and improvements to such variants, and to the technologies by which such special-purpose machines become improved compared to other special-purpose machines that provide impersonation detection technology. In particular, the present disclosure addresses systems and methods for impersonation detection and abuse prevention in a social networking service.

BACKGROUND

Impersonation and abuse are common problems in the social networking space. For instance, an impersonator may create a social networking account with a celebrity's name and then make postings in the social networking service as the celebrity, without the celebrity's approval or endorsement. This may harm both the celebrity and the social networking service. As the foregoing illustrates, techniques for impersonation detection and abuse prevention in a social networking service may be desirable.

BRIEF DESCRIPTION OF THE DRAWINGS

Some embodiments of the technology are illustrated, by way of example and not limitation, in the figures of the accompanying drawings.

DETAILED DESCRIPTION

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

Some aspects of the subject technology address the problem in the computer arts of detecting impersonation and preventing abuse in a social networking service. This problem may be solved using the system shown in FIG. 1 or using another system with different machines. As used herein, a social networking service may encompass a professional networking service. The phrases "social networking service" and "professional networking service" may be used interchangeably.

Figure 1:
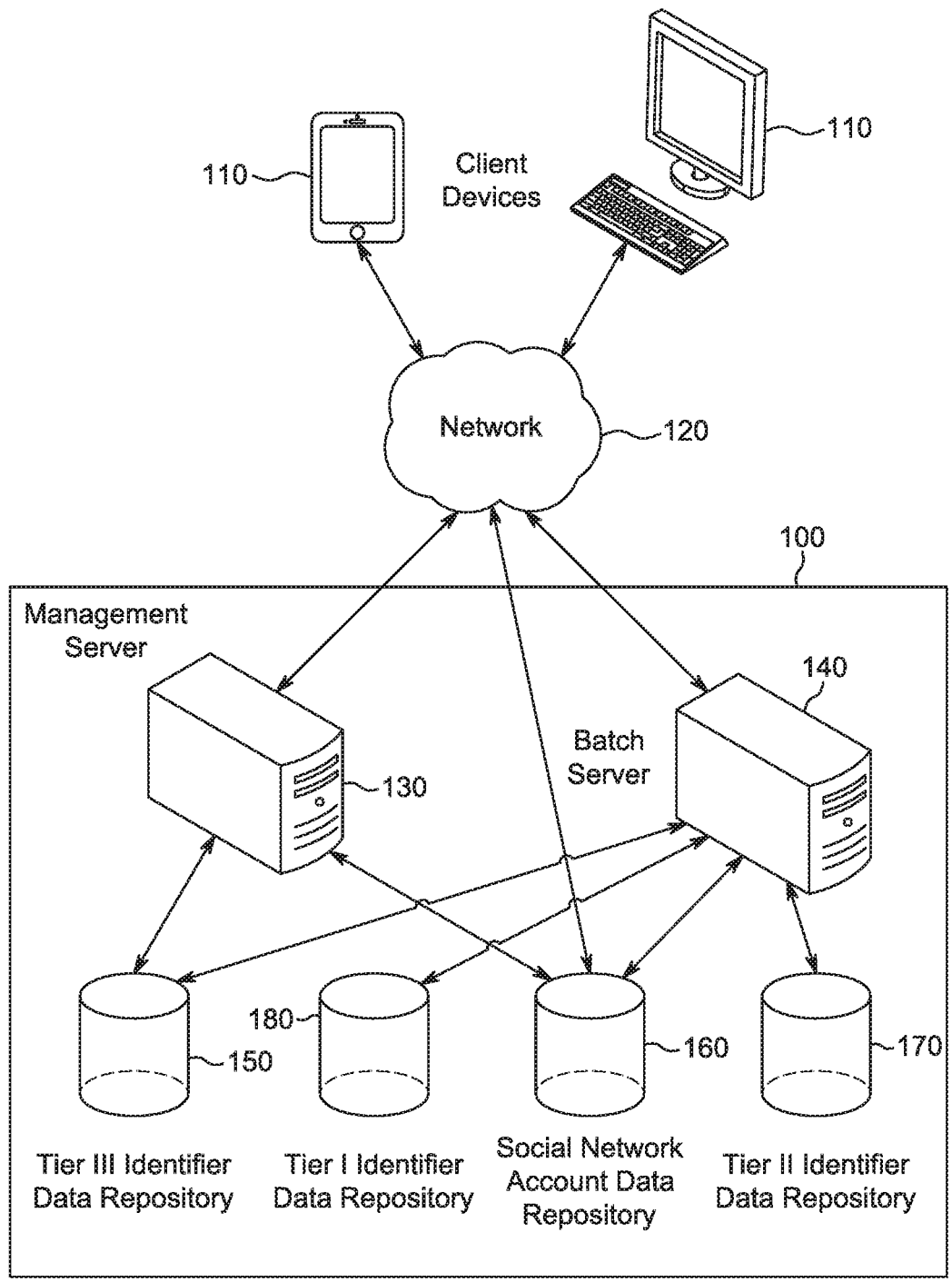
FIG. 1 illustrates an example social networking system in which impersonation detection and abuse prevention may be implemented, in accordance with some embodiments.

FIG. 1 illustrates an example social networking system 100 in which impersonation detection and abuse prevention may be implemented, in accordance with some embodiments. As shown, some machines of the social networking system 100 are connected to a network 120 and communicate with one another or with client device(s) 110 via the network 120. The network 120 may include one or more of the Internet, an intranet, a local area network, a wide area network, a wired network, a wireless network, a cellular network, a Virtual Private Network (VPN), and the like. Each client device 110 may be a desktop computer, a laptop computer, a mobile phone, a tablet computer, a smart watch, a smart television, and the like. As shown, the social networking service 100 includes a management server 130, a batch server 140, a Tier III Identifier Data Repository 150, a Social Network Account Data Repository 160, a Tier II Identifier Data Repository 170, and a Tier I Identifier Data Repository 180.

Information about accounts of the social networking service 100 may be stored in the Social Network Account Data Repository 160. Each account may be identified via a name (e.g., first name and last name) and additional identity-related information. The identity-related information may include, for example, a business Apple), an educational institution (e.g., Harvard), a geographic location (e.g., San Francisco, CA), a job title (e.g., chief executive officer), and a header (e.g., any text selected by a user of the account to further identify him/ herself). The Tier II Identifier Data Repository 150 stores <name, identity-related information> pairs for high-profile individuals who have been targets of impersonation attacks. In some cases, a person associated with the <name, identity-related information> stored in the Tier III Identifier Data Repository 150 may lack an account in the social networking service 100. Alternatively, such a person may have such an account. The Tier II Identifier Data Repository 170 stores <name, identity-related information> pairs for users who are more likely to be impersonated than the typical user is, for example, executives or board members of large financial companies with more than a threshold number of employees. Thus, tier II users may be proactively protected from impersonation. A third tier of processing, Tier I, is applied to all users of the social networking service whose <name, identity-related information> is stored in the Social Network Account Data Repository 160. In some cases, the Social Network Account Data Repository 160 may include a Tier I Identifier Data Repository 180, Alternatively, the Tier I Identifier Data Repository 180 may be a separate data repository from the Social Network Account Data Repository 160, and may store only identifiers (and not other account information).

Some aspects of the subject technology are implemented using the management server 130 and the batch server 140 of the social networking service 100. The management server 130 is a fast online server, which operates in real-time. The batch server 140 might not operate in real-time and operates via batch processing (e.g., using the Map Reduce algorithm). In some cases, the batch server 140 operates during off-peak hours when the network traffic is lower and accesses the network 120, the Social Network Account Data Repository 160, the Tier II Identifier Data Repository 170, and the Tier I Identifier Data Repository 180 once every threshold time period (e.g., once per day or once per week). The batch server 140 may operate via Extract, Transform, Load (ETL) or other data warehousing techniques. One or more of the Tier III Identifier Data Repository 150, the Social Network Account Data Repository 160, the Tier II Identifier Data Repository 170, and the Tier I Identifier Data Repository 180 may be implemented as a database or any other data storage unit.

In accordance with some implementations, the batch server 140 receives (e.g., from the client device 110 or from the Social Network Account Data Repository 160) a new registration or an update for an account. For example, a new account for "John Q. Sample" at "ABC Corporation" in "Nashville, Tennessee" may be created from the client device 110, or an existing account holder may change his/her name, business or geographic location using the client device 110. The account has a name and identity-related information. The batch server 140 determines that the name and the identity-related information of the account matches one or more other accounts of the social networking service, for example, by comparing the name and the identity-related information with <name, identity-related information> pairs of accounts in the Social Network Account Data Repository 160. The batch server 140 additionally detects a suspicious behavior by the account. The suspicious behavior may include one or more of: accessing the account from a machine used to access or create multiple different accounts, creating the account from a country different from a country where the user of the account is typically located, having an invalid email address associated with the account, and the account being blocked by another account. The batch server 140 limits, in response to the suspicious behavior, access to the account unless or until an identity of the user of the account is verified. 'Verifying information associated with the user or the user's business may be used as criteria for whitelisting, preventing the user account from being blocked, In some cases, these might not be used retroactively to unblock users. Users can appeal a determination by submitting official proof of identification (e.g., passport) to the social networking service 100 to verify that their identity matches their profile data. If the identity of the user is verified, the account is added to a whitelist.

In real-time upon receiving the new registration or the update for the account, the management server 130 determines if the name and the identity-related information of the account correspond to a tier III identifier from the Tier III Identifier Data Repository 150. The Tier III Identifier Data Repository 150 is coupled with the management server 130.

In a case where the name and the identity-related information correspond to the tier III identifier: the management server 130 blocks access to the account unless or until an identity of a user of the account is verified. The verification may include, for example, an employee of the user or the user's business providing a scan or a copy of a passport or identity card of the user to the customer service department of the social networking service 100 to verify that the account is legitimate. After verification, the account is added to a whitelist. Other verifying information can also be used for whitelisting.

After receiving the new registration or the update for the account and in parallel with the processing of the batch server 140 discussed above, the batch server 140 determines if the name and the identity-related information of the account correspond to a tier II identifier from the Tier II Identifier Data Repository 170, The Tier II Identifier Data Repository 170 is coupled with the batch server 140. In a case where the name and the identity-related information correspond to the tier II identifier: the batch server 140 limits access to the account unless or until an identity of a user of the account is verified. If the identity of the user is verified, the account is added to a whitelist. In some cases, the Tier II Identifier Data Repository 170 is populated based on users at risk for impersonation, such as users with high seniority at large companies in industries often targeted for impersonation, As a result of the technique described above, impersonation of people identified in the Tier III Identifier Data Repository 150 is prevented in real-time, to reduce anger by and damage to the reputations of the people and their associated businesses and ill-will toward the social networking service 100. Impersonation of people identified in the Tier II Identifier Data Repository 170 or users identified in the Social Network Account Data Repository (e.g., tier I) is identified more slowly using the batch server 140 (e.g., by daily batch processing). Thus, such impersonation is still prevented but more slowly and by using less aggressive measures and less expensive computing resources.

To be detected as a potential impersonator, the name or identity-related information fields may correspond exactly to the name or identity-related information of an entity in one of the data repositories 150, 160 or 170, or the name may be a variation of the name or identity-related information of such an entity. For example, "John Q. Smith" and "Mr, Smith" may be identified as corresponding to one another. "ABC Bank" and "ABC Insurance" may be identified as corresponding to one another. However, "DEF Bank of Florida" and "DEF Bank of Alabama," may map to different companies if the data repositories 150, 160 or 170 store information indicating that these two companies are different. Alternatively, these two companies may still be mapped to the same company in the data repositories 150, 160 or 170 if it is uncertain whether the name/ company variation is significant or not. For example, if "Apple Corporation" and "Apple Industrial LLC" are different companies, a "Steve Jobs" at "Apple Industrial LLC" may still be tagged as a fake account if there is concern that people may confuse "Steve Jobs" at "Apple Industrial LLC" with "Steve Jobs" at "Apple Corporation,"

In identifying names and identity-related information, the management server 130 or the batch server 140 may standardize the name, such as by ignoring punctuation, capitalization, and spaces.

It should be noted that, in some cases, the same name may be associated with multiple different identity-related information. For example, a person may have an employer, a job title, and a geographic location, each of which corresponds to the person's identity-related information.

Figure 2:
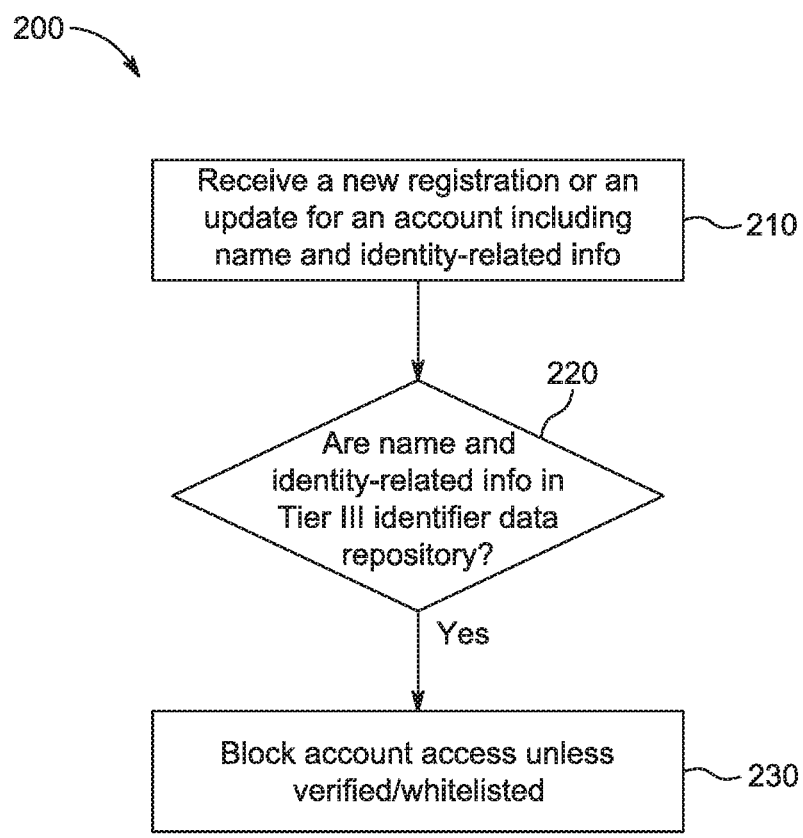
FIG. 2 is a flow chart illustrating an example method for impersonation detection and abuse prevention implemented at a management server, in accordance with some embodiments.

FIG. 2 is a flow chart illustrating an example method 200 for impersonation detection and abuse prevention implemented at the management server 130, in accordance with some embodiments.

At operation 210, the management server 130 receives (e.g., from the client device 110 or the Social Network Account Data Repository 160) a new registration or an update for an account including a name and identity-related information.

At operation 220, the management server 130 determines if the name and the identity-related information are in the Tier III Identifier Data Repository 150 (e.g., indicating that the account holder has the same name and identity-related information as a high-profile individual). If so, the method 200 continues to operation 230.

At operation 230, upon determining that the name and the identity-related information are in the Tier III Identifier Data Repository 150, the management server 130 blocks access to the account unless or until an identity of a user of the account is verified/whitelisted. If the identity of the user is verified, the account is whitelisted to prevent future blocking or limiting of access.

The management server 130 carries out the operations 220 and 230 in real-time after receiving the new registration or the update of operation 210. The term "real-time" may include operations being completed without any intentional delay by the management server 130. However, in some cases, there may still be some delay, for example, due to network traffic, poor connectivity, poorly functioning processors, and the like. A real-time operation may be completed within 0.1 seconds, within 1 second, within 10 seconds, within 1 minute, within 1 hour, etc.

In some cases, the social networking service 100 hires people to populate the Tier III Identifier Data Repository 150 with names and identity-related information of high-profile users or individuals who are not users. In some cases, the Tier III Identifier Data Repository 150 is populated based on complaints provided to the social networking service 100 based on accounts allegedly impersonating users or other individuals. In some cases, the social networking service 100 also populates the Tier III Identifier Data Repository 150 using automated procedures such as by pulling impersonated or otherwise abused <name, identity-related information> pairs from the Social Network Account Data Repository 160.

Figure 3:
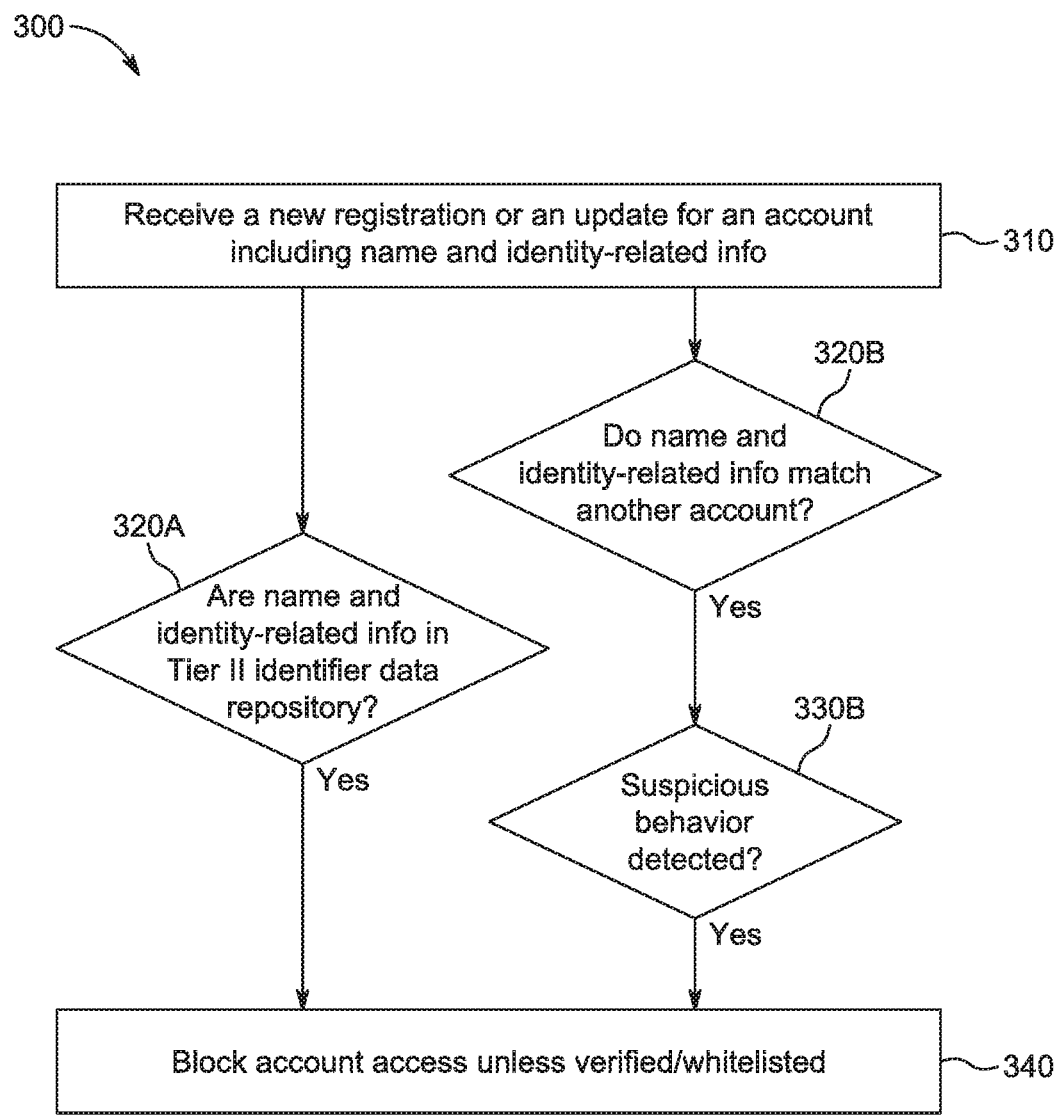
FIG. 3 is a flow chart illustrating an example method for impersonation detection and abuse prevention implemented at a batch server, in accordance with some embodiments.

FIG. 3 is a flow chart illustrating an example method 300 for impersonation detection and abuse prevention implemented at a batch server 140, in accordance with some embodiments.

At operation 310, the batch server 140 receives (e.g., from the client device 110 or the Social Network Account Data Repository 160) a new registration or an update for an account including a name and identity-related information. The batch server 140 may access the Social Network Account Data Repository 160 and receive all new registrations or updates once per threshold time period (e.g., day, two days, week, etc.). The operations of the batch server 140 described here may occur simultaneously with or later than the operations of the management server 130 in the method 200. After operation 310, the method 300 continues to operation 320A or 320B. The operation 320A may be completed simultaneously and in parallel with the operation 320B and 330B. Alternatively, the operation 320A may be completed before or after the operations 320B and 330B.

At operation 320A, the batch server 140 determines if the name and the identity-related information are in the Tier II Identifier Data Repository 170 (e.g., indicating that the account holder has the same name and identity-related information as a public figure, such as an executive or leader of a large bank or finance company). If so, the method 300 continues to operation 340.

At operation 320B, the batch server 140 determines if the name and the identity-related information of the account matches one or more other accounts of the social networking service 100, for example, based on data in the Social Network Account Data Repository 160. If so, the method 300 continues to operation 330B.

At operation 330B, the batch server 140 determines if a suspicious behavior of the account is detected. The suspicious behavior may include one or more of: accessing the account from a machine used to access or create multiple different accounts, creating the account from a country different from a country where the user of the account is typically located, having an invalid email address associated with the account, and the account being blocked by another account. If the suspicious behavior of the account s detected, the method 300 continues to operation 340.

At operation 340, the batch server 140 blocks access to the account unless or until the identity of a user of the account is verified/whitelisted. If the identity of the user is verified, the account is whitelisted to prevent future blocking or limiting of access.

In some cases, the social networking service 100 hires people or uses automated algorithms to populate the Tier II Identifier Data Repository 170 by identifying high seniority people at large companies. The social networking service 100 examines its data for users that have high seniority at large companies in certain industries, verifies that they have a real identity, and then protects their profile data via the Tier II protection approach.

Aspects of the subject technology block accounts (which might be used for impersonating other people) from the social networking service 100. While such blocking may be useful to prevent damage to the reputations of the people who are impersonated and of the social networking service 100, such blocking may result in displeasure by people who are unable to legitimately use the social networking service 100. To prevent blocking of legitimate users, aspects of the subject technology make use of whitelisting. A whitelist of legitimate accounts that are not to be blocked from the social networking service 100 may be stored in a data repository accessible to the management server 130 and the batch server 140. For example, the whitelist may be stored at the Social Network Account Data Repository 160. Alternatively, certain accounts in the Social Network Account Data Repository 160 may be tagged as being whitelisted. In one example, the subject technology includes maintaining, at a data repository coupled with the management server or the batch server, a set of whitelisted accounts, and foregoing limiting access to the set of whitelisted accounts in response to suspicious behavior.

For example, if a young man named "Walt Disney" (not the founder of Disney Company) moves to Orlando, Florida, the young man may be blocked from the social networking service 100, as "Walt Disney/ Orlando, Florida" might be listed in the Tier III Identifier Data Repository 150, the Tier II Identifier Data Repository 170 or the Tier I Identifier Data Repository 180. Once Walt Disney's identity is verified (e.g., manually or electronically) per the requirements discussed in conjunction with FIGS. 2-3, Walt Disney's account is whitelisted (e.g., added to a whitelist or tagged as being whitelisted), so that Walt Disney is no longer prevented from using the social networking service 100 per the methods 200 or 300.

Aspects of the subject technology may be described in the context of various tiers of users in a social networking service. Each tier corresponds to a different level of protection from impersonation detection and abuse. Tier I includes all users of the social networking service. Tier II includes at-risk users of the social networking service (e.g., the CEO of a large regional bank in California). Tier III includes previously targeted and high-profile users of the social networking service (e.g., the President of the United States). These tiers are described in conjunction with FIGS. 4-6.

Figure 4:
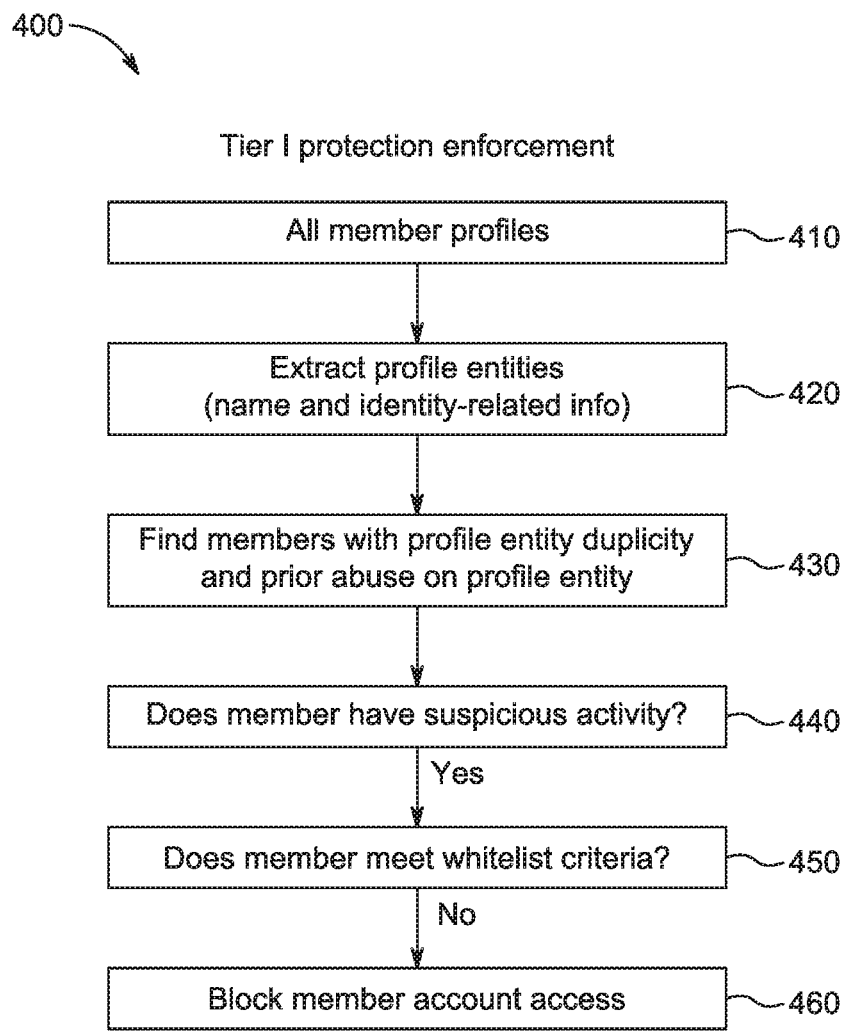
FIG. 4 is a flow chart illustrating an example Tier I protection enforcement method, in accordance with some embodiments.

FIG. 4 is a flow chart illustrating an example Tier I protection enforcement method 400, in accordance with some embodiments. The method 400 may be implemented at the batch server 140.

At operation 410, the batch server 140 takes all user profiles. At operation 420, the batch server 140 extracts profile entities (e.g., name and identity-related information) from the user profiles. At operation 430, the batch server 140 finds users with profile entity duplicity and prior abuse on the profile entity. At operation 440, the batch server 140 determines if a user found at operation 430 has suspicious activity. If so, at operation 450, the batch server 140 determines if the user identified at operation 440 meets whitelist criteria. If not, at operation 460, the batch server 140 blocks user account access.

Figure 5A:
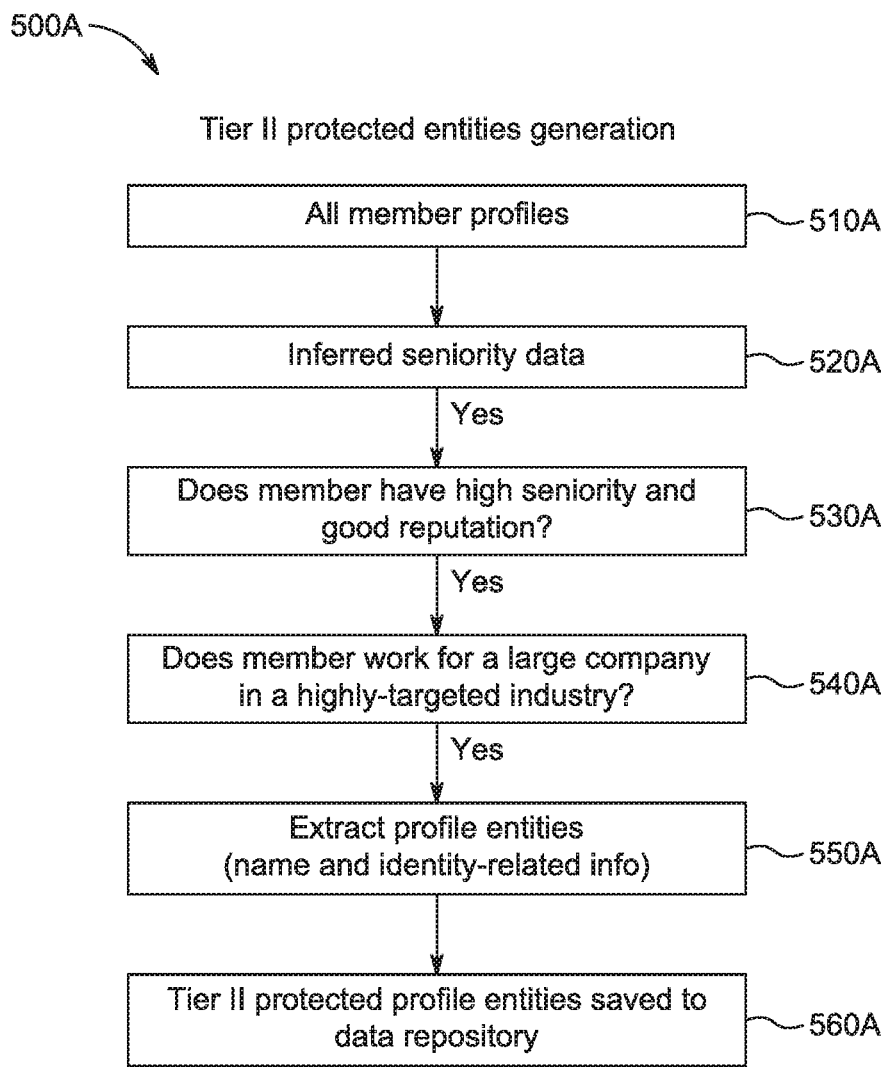
FIG. 5A is a flow chart illustrating an example Tier II protected entities generation method, in accordance with some embodiments.
Figure 5B:
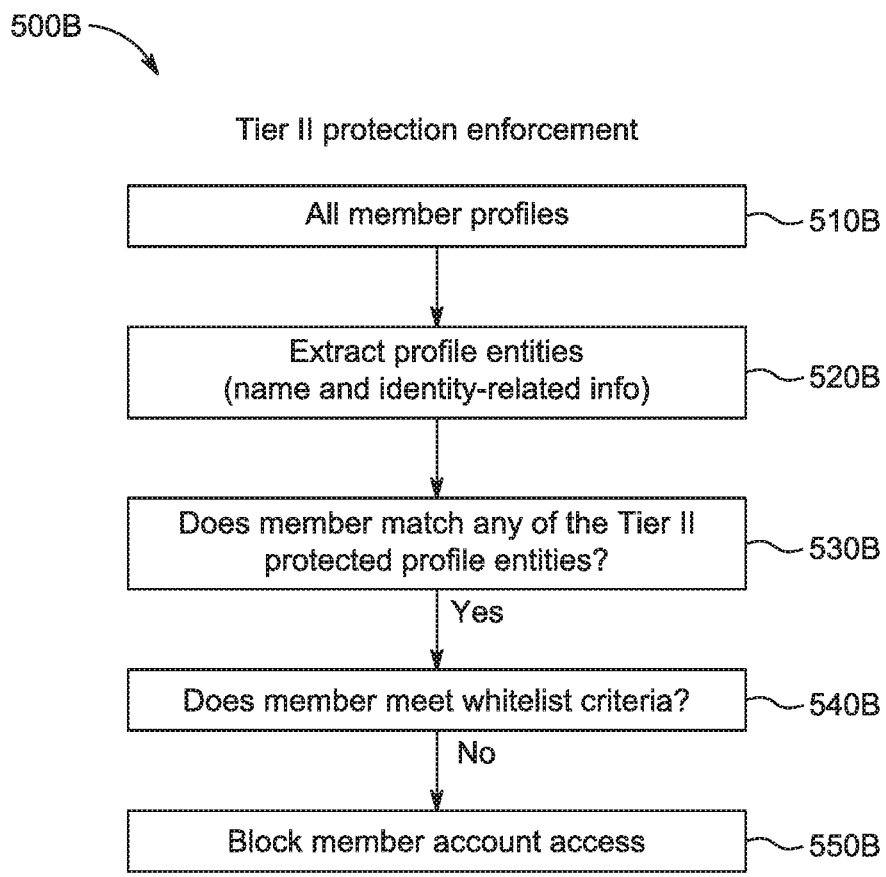
FIG. 5B is a flow chart illustrating an example Tier II protection enforcement method, in accordance with some embodiments.

FIG. 5A is a flow chart illustrating an example Tier II protected entities generation method 500A, in accordance with some embodiments. The method 500A may be implemented at the batch server 140.

At operation 510A, the batch server 140 takes all user profiles. At operation 520A, the batch server 140 infers seniority data from the user profiles (e.g., from information specified in the user profiles). If seniority data exists, at operation 530A, the batch server 140 determines if the user has high seniority and a good reputation (e.g., no or few (e.g., relative to total number of posts) complaints or blocking). If so, at operation 540A, the batch server 140 determines if the user works for a large company (e.g., more than a predefined number of employees) in a highly targeted industry (e.g., technology, music, media, or banking). if so, at operation 550A, the batch server 140 extracts profile entities (e.g., name and identity-related information) from the profile. At operation 560A, the Tier II protected profile entities are saved to the Tier II Identifier Data Repository 170.

FIG. 513 is a flow chart illustrating an example Tier II protection enforcement method 500B, in accordance with some embodiments. The method 500B may be implemented at the batch server 140.

At operation 510B, the batch server 140 takes all user profiles. At operation 520B, the batch server extracts profile entities (e.g., name and identity-related information) from the profiles. At operation 530B, the batch server 140 determines if a user matches any of the Tier II protected profile entities in the Tier II Identifier Data Repository 170. If so, at operation 540B the batch server 140 determines if the user meets whitelist criteria. If not, at operation 550B, the batch server 140 blocks the user's account access.

Figure 6A:
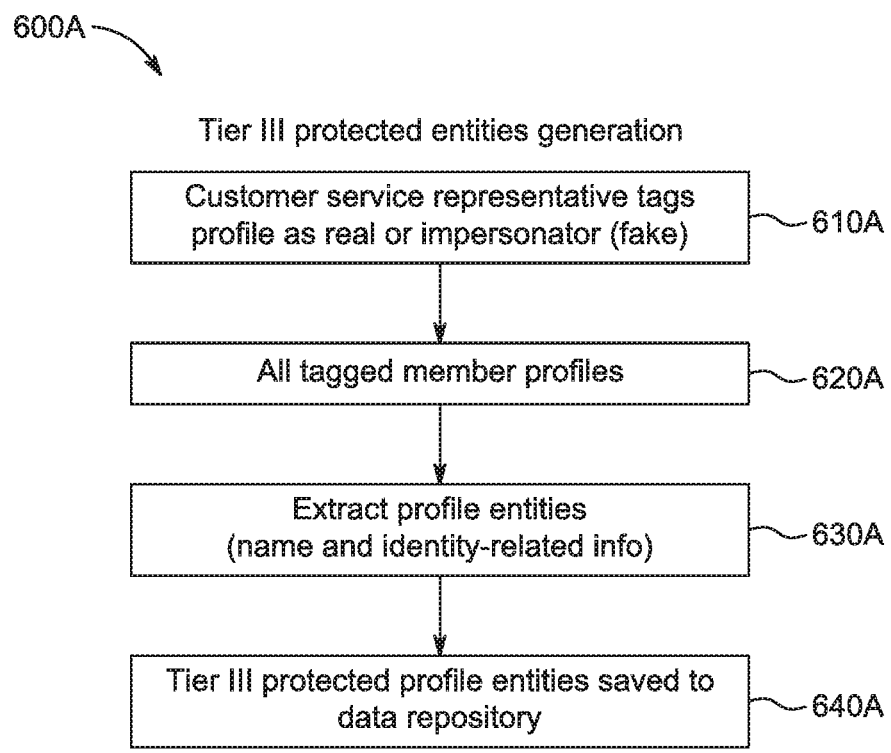
FIG. 6A is a flow chart illustrating an example Tier III protected entities generation method, in accordance with some embodiments.
Figure 6B:
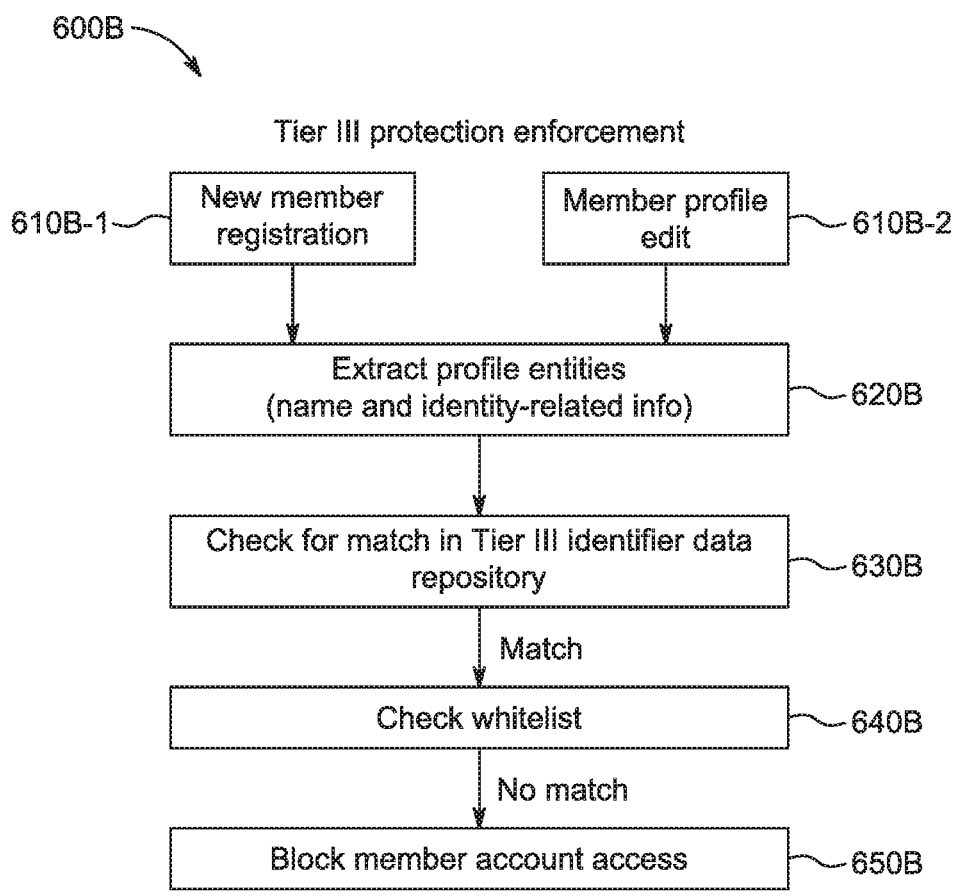
FIG. 6B is a flow chart illustrating an example Tier III protection enforcement method, in accordance with some embodiments.

FIG. 6A is a flow chart illustrating an example Tier III protected entities generation method 600A, in accordance with some embodiments. The method 600A may be implemented at the batch server 140.

At operation 610A, a customer service representative of the social networking service 100 tags profiles in the social networking service 100 as real or impersonator (fake). At operation 620A, the batch server 140 takes all tagged user profiles. At operation 630A, the batch server 140 extracts profile entities (e.g., name and identity-related information) from the tagged user profiles. At operation 640A, the batch server 140 saves the Tier III protected profile entities to the Tier III Identifier Data Repository 150.

FIG, 6B is a flow chart illustrating an example Tier III protection enforcement method 600B, in accordance with some embodiments. The method 600B may be implemented at the management server 130.

The method 600B begins at operation 61013-1 with a new user registration at the social networking service 100 or at operation 610B-2 with a user profile edit at the social networking service 100. At operation 62013, the management server 130 extracts profile entities (e.g., name and identity-related information) from a profile associated with the new user registration or the user profile edit. At operation 630B, the management server 130 checks for a match to the extracted profile entities in the Tier III Identifier Data Repository 150. If there is a match, at operation 640B, the management server 130 checks a whitelist. If there is no match with the whitelist, at operation 650B, the management server 130 blocks the user's account access.

The subject technology is described herein in the social/professional networking context. However, the subject technology may be useful in other contexts also. For example, the subject technology may be useful in a service that provides personal email addresses or any other service that relies on identity verification or identity representation.

MODULES, COMPONENTS, AND LOGIC

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

MACHINE AND SOFTWARE ARCHITECTURE

The modules, methods, applications, and so forth described in conjunction with FIGS. 1-6B are implemented in some embodiments in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

EXAMPLE MACHINE ARCHITECTURE AND MACHINE-READABLE MEDIUM

Figure 7:
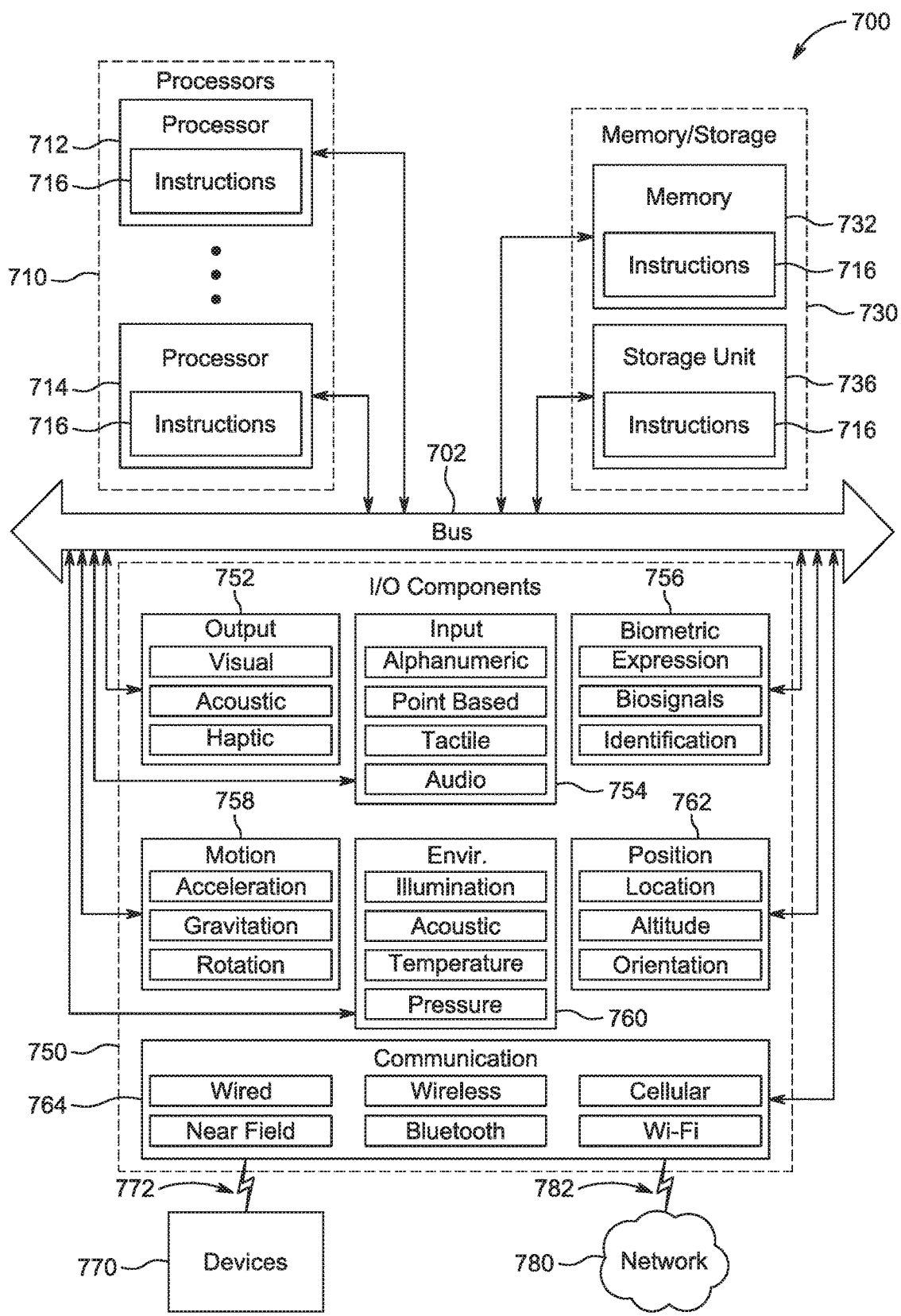
FIG. 7 is a block diagram illustrating components of a machine able to read instructions from a machine-readable medium and perform any of the methodologies discussed herein, in accordance with some embodiments.

FIG. 7 is a block diagram illustrating components of a machine 700, according to some example embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. The instructions 716 transform the general, non-programmed machine into a particular machine programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 may include processors 710, memory/storage 730, and I/O components 750, which may be configured to communicate with each other such as via a bus 702. In an example embodiment, the processors 710 (e.g., a Central Processing Unit (CPU), a Reduced Instruction Set Computing (RISC) processor, a Complex Instruction Set Computing (CISC) processor, a Graphics Processing Unit ((W U), a Digital Signal Processor (DSP), an ASIC, a Radio-Frequency Integrated Circuit (RFIC), another processor, or any suitable combination thereof) may include, for example, a processor 712 and a processor 714 that may execute the instructions 716. The term "processor" is intended to include multi-core processors that may comprise two or more independent processors (sometimes referred to as "cores") that may execute instructions contemporaneously. Although FIG. 7 shows multiple processors 710, the machine 700 may include a single processor with a single core, a single processor with multiple cores (e.g., a multi-core processor), multiple processors with a single core, multiple processors with multiples cores, or any combination thereof.

The memory/storage 730 may include a memory 732, such as a main memory, or other memory storage, and a storage unit 736, both accessible to the processors 710 such as via the bus 702. The storage unit 736 and memory 732 store the instructions 716 embodying any one or more of the methodologies or functions described herein. The instructions 716 may also reside, completely or partially, within the memory 732, within the storage unit 736, within at least one of the processors 710 (e.g., within the processor's cache memory), or any suitable combination thereof, during execution thereof by the machine 700. Accordingly, the memory 732, the storage unit 736, and the memory of the processors 710 are examples of machine-readable media.

As used herein, "machine-readable medium" means a device able to store instructions (e.g., instructions 716) and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 716. The term "machine-readable medium" shall also be taken to include any medium, or combination of multiple media, that is capable of storing instructions (e.g., instructions 716) for execution by a machine (e.g., machine 700), such that the instructions, when executed by one or more processors of the machine (e.g., processors 710), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 750 may include a wide variety of components to receive input, provide output, produce output, transmit information, exchange information, capture measurements, and so on. The specific I/O components 750 that are included in a particular machine will depend on the type of machine. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion and the grouping is in no way limiting. In various example embodiments, the I/O components 750 may include output components 752 and input components 754. The output components 752 may include visual components (e.g., a display such as a plasma display panel (PUP), a light emitting diode (LED) display, a liquid crystal display (LCD), a projector, or a cathode ray tube (CRT)), acoustic components speakers), haptic components (e.g., a vibratory motor, resistance mechanisms), other signal generators, and so forth. The input components 754 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 750 may include biometric components 756, motion components 758, environmental components 760, or position components 762, among a wide array of other components. For example, the biometric components 756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 758 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 762 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 750 may include communication components 764 operable to couple the machine 700 to a network 780 or devices 770 via a coupling 782 and a coupling 772, respectively. For example, the communication components 764 may include a network interface component or other suitable device to interface with the network 780. In further examples, the communication components 764 may include wired communication components, wireless communication components, cellular communication components, Near Field Communication (NEC) components, Bluetooth® components (e.g., Bluetooth® Low Energy), Wi-Fi® components, and other communication components to provide communication via other modalities. The devices 770 may be another machine or any of a wide variety of peripheral devices (e.g., a peripheral device coupled via a USB).

Moreover, the communication components 764 may detect identifiers or include components operable to detect identifiers. For example, the communication components 764 may include Radio Frequency Identification (RFD) tag reader components, NEC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 764, such as location via Internet Protocol (IP) geolocation, location via Wi-Fi® signal triangulation, location via detecting an NEC beacon signal that may indicate a particular location, and so forth.

TRANSMISSION MEDIUM

In various example embodiments, one or more portions of the network 780 may be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 780 or a portion of the network 780 may include a wireless or cellular network and the coupling 782 may be a Code Division Multiple Access (CDMA) connection, a Global System for Mobile communications (GSM) connection, or another type of cellular or wireless coupling. In this example, the coupling 782 may implement any of a variety of types of data transfer technology, such as Single Carrier Radio Transmission Technology (1xRTT), Evolution-Data Optimized (ENDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 716 may be transmitted or received over the network 780 using a transmission medium via a network interface device (e.g., a network interface component included in the communication components 764) and utilizing any one of a number of well-known transfer protocols (e.g., HTTP). Similarly, the instructions 716 may be transmitted or received using a transmission medium via the coupling 772 (e.g., a peer-to-peer coupling) to the devices 770. The term "transmission medium" shall be taken to include any intangible medium that is capable of storing, encoding, or carrying the instructions 716 for execution by the machine 700, and includes digital or analog communications signals or other intangible media to facilitate communication of such software.

LANGUAGE

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   receiving, at a batch server of a social networking service, a new registration or an update for an account, the account comprising a name and identity-related information;
   determining, at the batch server of the social networking service, that the name and the identity-related information of the account matches one or more other accounts of the social networking service;
   detecting, at the batch server, a suspicious behavior of the account;
   limiting, in response to the suspicious behavior, access to the account unless or until an identity of a user of the account is verified;
   determining, at the batch server and after receiving the new registration or the update for the account, if the name and the identity-related information of the account correspond to a tier II identifier from a Tier II Identifier Data Repository, the Tier II Identifier Data Repository being coupled with the batch server; and
   in a case where the name and the identity-related information correspond to the tier II identifier: limiting access to the account unless or until an identity of a user of the account is verified.

2. The method of claim 1, further comprising:
   determining, at a management server and in real-time upon receiving the new registration or the update for the account, if the name and the identity-related information of the account correspond to a tier III identifier from a Tier III Identifier Data Repository, the Tier III Identifier Data Repository being coupled with the management server and the batch server; and
   in a case where the name and the identity-related information correspond to the tier III identifier: blocking access to the account unless an identity of a user of the account is verified.

3. The method of claim 2, further comprising:
   populating the Tier III Identifier Data Repository based on complaints provided to the social networking service or based on a previous history of impersonation abuse.

4. The method of claim 1, further comprising:
   populating the Tier II Identifier Data Repository based on users at risk for impersonation, the users being at risk for impersonation being identified as those with high seniority at large companies in a set of industries.

5. The method of claim 1, wherein a management server operates in real-time, and wherein the batch server operates via non-real-time batch processing.

6. The method of claim 1, wherein the identity-related information comprises information related to one or more of: a business, an educational institution, a geographic location, a job title, and a header.

7. The method of claim 1, wherein the suspicious behavior comprises one or more of:
   accessing the account from a machine used to access or create multiple different accounts,
   creating the account from a country different from a country where the user of the account is located,
   having an invalid email address associated with the account, and
   the account being blocked by another account.

8. The method of claim 1, further comprising:
   maintaining, at a data repository coupled with a management server or the batch server, a set of whitelisted accounts; and
   foregoing limiting access to the set of whitelisted accounts in response to suspicious behavior.

9. A non-transitory machine-readable medium comprising instructions which, when executed by one or more machines in a social networking service, cause the one or more machines to carry out operations comprising:
   receiving, at a batch server of the social networking service, a new registration or an update for an account, the account comprising a name and identity-related information;
   determining, at the batch server of the social networking service, that the name and the identity-related information of the account matches one or more other accounts of the social networking service;
   detecting, at the batch server, a suspicious behavior of the account; and
   limiting, in response to the suspicious behavior, access to the account unless or until an identity of a user of the account is verified;
   determining, at the batch server and after receiving the new registration or the update for the account, if the name and the identity-related information of the account correspond to a tier II identifier from a Tier II Identifier Data Repository, the Tier II Identifier Data Repository being coupled with the batch server; and
   in a case where the name and the identity-related information correspond to the tier II identifier: limiting access to the account unless or until an identity of a user of the account is verified.

10. The machine-readable medium of claim 9, the operations further comprising:
    determining, at a management server and in real-time upon receiving the new registration or the update for the account, if the name and the identity-related information of the account correspond to a tier III identifier from a Tier III Identifier Data Repository, the Tier III Identifier Data Repository being coupled with the management server and the batch server; and
    in a case where the name and the identity-related information correspond to the tier III identifier: blocking access to the account unless an identity of a user of the account is verified.

11. The machine-readable medium of claim 9, wherein a management server operates in real-time, and wherein the batch server operates via non-real-time batch processing.

12. The machine-readable medium of claim 9, wherein the identity-related information comprises information related to one or more of:
    a business, an educational institution, a geographic location, a job title, and a header.

13. The machine-readable medium of claim 9, wherein the suspicious behavior comprises one or more of:
    accessing the account from a machine used to access or create multiple different accounts,
    creating the account from a country different from a country where the user of the account is located,
    having an invalid email address associated with the account, and
    the account being blocked by another account.

14. The machine-readable medium of claim 9, the operations further comprising:
    maintaining, at a data repository coupled with a management server or the batch server, a set of whitelisted accounts; and
    foregoing limiting access to the set of whitelisted accounts in response to suspicious behavior.

15. A system comprising:
a management server and a batch server, the management server operating in real-time, and the batch server operating via non-real-time batch processing, wherein the management server comprises a management server hardware processor and a management server memory, and wherein the batch server comprises a batch server hardware processor and a batch server memory;
the management server or the batch server to receive a new registration or an update for an update for an account, the account comprising a name and identity-related information;
the batch server to determine that the name and the identity-related information of the account matches one or more other accounts of a social networking service;
the batch server to detect a suspicious behavior of the account;
the batch server to limit, in response to the suspicious behavior, access to the account unless or until an identity of a user of the account is verified;
wherein the batch server is further to:
determine, at the batch server and after receiving the new registration or the update for the account, if the name and the identity-related information of the account correspond to a tier II identifier from a Tier II Identifier Data Repository, the Tier II Identifier Data Repository being coupled with the batch server; and
in a case where the name and the identity-related information correspond to the tier II identifier: limit access to the account unless or until an identity of a user of the account is verified.

16. The system of claim 15, wherein the management server is further to:
determine, in real-time upon receiving the new registration or the update for the account, if the name and the identity-related information of the account correspond to a tier III identifier from a Tier III Identifier Data Repository, the Tier III Identifier Data Repository being coupled with the management server and the batch server; and
in a case where the name and the identity-related information correspond to the tier III identifier: block access to the account unless an identity of a user of the account is verified.

17. The system of claim 15, wherein the identity-related information comprises information related to one or more of: a business, an educational institution, a geographic location, a job title, and a header.

18. The system of claim 15, wherein the suspicious behavior comprises one or more of:
accessing the account from a machine used to access or create multiple different accounts,
creating the account from a country different from a country where the user of the account is located,
having an invalid email address associated with the account, and
the account being blocked by another account.

19. A method comprising:
receiving, at a management server of a social networking service, a new registration or an update for an account, the account comprising a name and identity-related information;
determining, at the management server and in real-time upon receiving the new registration or the update for the account, if the name and the identity-related information of the account correspond to a tier III identifier from a Tier III Identifier Data Repository, the Tier III Identifier Data Repository being coupled with the management server and a batch server, and
in a case where the name and the identity-related information correspond to the tier III identifier: blocking access to the account unless an identity of a user of the account is verified.

20. The method of claim 19, further comprising:
populating the Tier III Identifier Data Repository based on complaints provided to the social networking service or based on a previous history of impersonation abuse.

21. A method comprising:
receiving, at a batch server of a social networking service, a new registration or an update for an account, the account comprising a name and identity-related information;
determining, at the batch server and after receiving the new registration or the update for the account, if the name and the identity-related information of the account correspond to a tier II identifier from a Tier II Identifier Data Repository, the Tier II Identifier Data Repository being coupled with the batch server; and
in a case where the name and the identity-related information correspond to the tier II identifier: limiting access to the account unless or until an identity of a user of the account is verified.

22. The method of claim 21, further comprising:
populating the Tier II Identifier Data Repository based on users at risk for impersonation, the users being at risk for impersonation being identified as those with high seniority at large companies in a set of industries.

* * * * *

UNITED STATES PATENT AND TRADEMARK OFFICE
CERTIFICATE OF CORRECTION

PATENT NO. : 10,320,811 B1
APPLICATION NO. : 15/458592
DATED : June 11, 2019
INVENTOR(S) : Faham et al.

Page 1 of 1

It is certified that error appears in the above-identified patent and that said Letters Patent is hereby corrected as shown below:

In the Claims

In Column 17, Line 11, in Claim 15, delete "an update for an update for an" and insert --an update for an-- therefor In Column 18, Line 21, in Claim 19, delete "server," and insert --server;-- therefor Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*